(12) United States Patent
Vogl et al.

(10) Patent No.: US 7,886,533 B2
(45) Date of Patent: Feb. 15, 2011

(54) HYDROSTATIC TRAVEL DRIVE WITH DIFFERENTIAL LOCKING ACTION

(75) Inventors: Karl-Heinz Vogl, Ummendorf (DE); Heinz-Gerhard Essig, Lonsee (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 341 days.

(21) Appl. No.: 11/793,571

(22) PCT Filed: Dec. 14, 2005

(86) PCT No.: PCT/EP2005/013435

§ 371 (c)(1),
(2), (4) Date: Aug. 14, 2007

(87) PCT Pub. No.: WO2006/066771

PCT Pub. Date: Jun. 29, 2006

(65) Prior Publication Data

US 2008/0087015 A1    Apr. 17, 2008

(30) Foreign Application Priority Data

Dec. 21, 2004  (DE)  ........................ 10 2004 061 557

(51) Int. Cl.
 *F16D 31/02* (2006.01)
(52) U.S. Cl. ....................................................... 60/484
(58) Field of Classification Search .................... 60/484
 See application file for complete search history.

(56) References Cited

U.S. PATENT DOCUMENTS 6,276,468 B1 * 8/2001 Essig et al. .................... 60/484

2004/0216456 A1   11/2004 Cousin et al.

FOREIGN PATENT DOCUMENTS

| DE | 198 33 942 A1 | 2/2000 |
|---|---|---|
| DE | 198 38 651 A1 | 3/2000 |
| DE | 100 32 514 A1 | 1/2002 |
| EP | 0 012 902 | 7/1980 |
| EP | 0 025 372 | 3/1981 |
| WO | WO 00/06408 | 2/2000 |
| WO | WO 01/51303 A1 | 7/2001 |
| WO | WO 2005/053989 A1 | 6/2005 |

* cited by examiner

*Primary Examiner*—F. Daniel Lopez
(74) *Attorney, Agent, or Firm*—Scully, Scott, Murphy & Presser, P.C.

(57) ABSTRACT

The invention relates to a hydrostatic drive (1) comprising at least one first hydraulic pump (4), a second hydraulic pump (5), and first, a second, a third, and a forth hydraulic motor (7, 8, 9, 10). A first connection (12) of the first hydraulic pump (4) is connected to a first connection (19) of the first hydraulic motor (7) and a first connection (20) of the third hydraulic motor (9). A first connection (16) of the second hydraulic pump (5) is connected to a first connection (26) of the second hydraulic motor (8) and a first connection (27) of the fourth hydraulic motor (10). A second connection (22) of the first hydraulic motor (7) and a second connection (29) of the fourth hydraulic motor (10) are connected to a second connection (18) of the second hydraulic pump (5). A second connection (28) of the second hydraulic motor (8) and a second connection (23) of the third hydraulic motor (9) are connected to a second connection (14) of the first hydraulic pump (4).

7 Claims, 1 Drawing Sheet

HYDROSTATIC TRAVEL DRIVE WITH DIFFERENTIAL LOCKING ACTION

Figure 1:
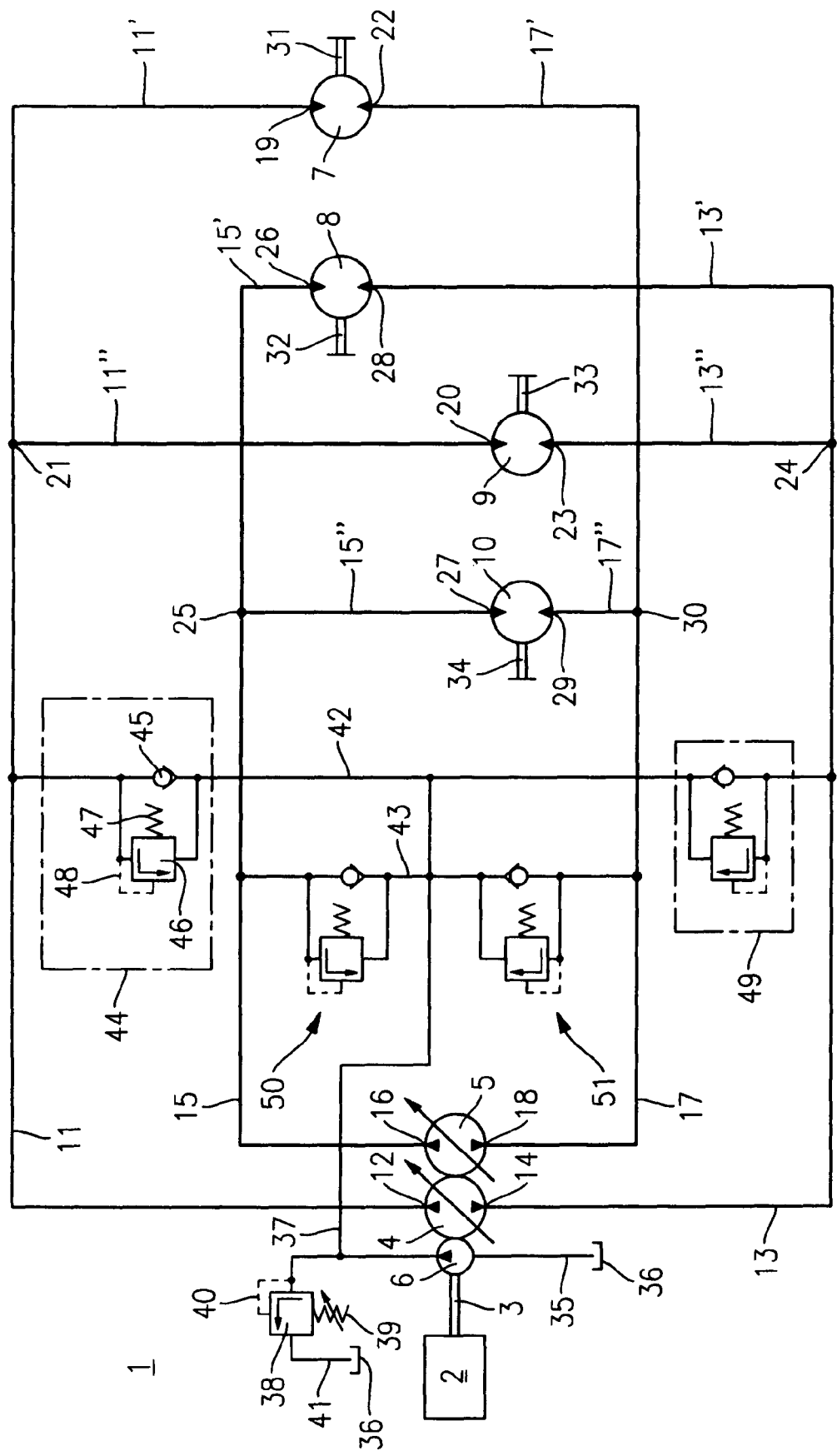

The invention relates to a hydrostatic travel drive with at least two hydro pumps and four hydro motors with differential locking action.

A hydrostatic travel drive, in which four hydro motors are driven by two adjustable pumps, is already known from DE 198 33 942 A1. Each of the hydro motors and the hydro pumps provides a first connection and a second connection. Starting from the first connection of the first hydro pump, two of the hydro motors are charged with pressure medium via their first connection as the input. However, the outputs of these two hydro motors are not connected to the second connection of the first hydro pump, but to the second connection acting as the input of the second hydro pump. The output of the second hydro pump is once again connected to the connections acting as the input of the two other hydro motors. However, the outputs of the two last-named hydro motors are connected to the second connection of the first hydro pump. Accordingly, a closed hydraulic circuit is formed, wherein a pumping sequence of pump-motor-pump-motor-pump is realised respectively.

This so-called cross connection of the hydro motors with the hydro pumps means that a relatively rapidly-rotating hydro motor must be supported on the hydro pump, which does not supply the respective hydro motor with pressure medium. A forced running of the individual hydro motors is achieved because of the oil-flow balance in the closed-circuit.

The disadvantage with the travel drive described is that the hydro motors must be adjusted in an exactly identical manner with regard to their absorption volume because of the rigid oil-flow balance. In practical applications, only constant motors, with which a correspondingly accurate adjustment of the respective absorption volumes is possible, can therefore be considered in principle.

The object of the invention is to provide a hydrostatic travel drive with a differential locking action, in which an individual adaptation of the angle of rotation of the hydro motors is possible.

This object is achieved with the hydrostatic travel drive according to the invention by the features of claim 1.

The hydrostatic travel drive according to the invention provides at least two hydro pumps and four hydro motors. The hydro pumps and the hydro motors each provide a first connection and a second connection. The first connection of the first and the third hydro motor is connected in each case to the first connection of the first hydro pump. However, the first connection of the second hydro pump is connected to the first connection of the second and the fourth hydro motor.

The second connection of the first hydro pump is connected to the second connection of the second hydro motor and the second connection of the third hydro motor. However, the second connection of the second hydro pump is connected to the second connection of the first hydro motor and the second connection of the fourth hydro motor. Accordingly, the third and the fourth hydro motor respectively are assigned only to one hydro pump and each form a conventional circuit with the latter.

By contrast, the first and the second hydro motor, are arranged in a so-called cross connection. In a cross connection, the pressure medium is pumped in the sequence pump-hydro motor-pump-hydro motor.

With this combination, in which two of the hydro motors are connected to the two hydro pumps in a cross connection, but the other two hydro motors are each assigned in a conventional manner to one hydro pump, an oil-flow balance is obtained, which is not-completely-rigid. This provides the advantage that the agreement of the angle of rotation of the hydro motors is not critical and, for example, can be adjusted in a manner dependent upon loading pressure.

An exact identity of the absorption volumes of the hydro motors relative to one another is not required. At the same time, a differential locking action is obtained, because two of the hydro motors are arranged through a cross connection in such a manner that they must be supported upon the hydro pump pressurising the respective other hydro motor.

Advantageous further developments of the hydrostatic travel drive according to the invention are presented in the dependent claims.

In particular, it is advantageous to assign the first and the second hydro motor to one vehicle axle. Accordingly, the two drive wheels of a vehicle axle are connected respectively to one hydro motor charged respectively by a cross connection.

In particular, it is also advantageous to assign the third and the fourth hydro motor jointly to another vehicle axis. In the case of vehicles, which provide a strongly preferred direction of travel, this achieves a preferred symmetry, wherein no influence of the travel drive occurs during travel around a curve.

In another arrangement, it can be advantageous, if the vehicle provides an increased symmetry, particularly with regard to the forward and backward directions of travel. For this purpose, it is particularly advantageous to assign the first and second hydro motor to one side of the vehicle. For example, the first and the second hydro motor can be connected to the right-hand side of the vehicle.

One preferred exemplary embodiment of the hydrostatic travel drive according to the invention is presented in the drawings and described in greater detail in the description below. The drawings are as follows:

FIG. 1 shows a preferred exemplary embodiment of a hydrostatic vehicle drive according to the invention.

FIG. 1 presents a hydraulic circuit diagram of a hydrostatic travel drive 1 according to the invention. The hydrostatic travel drive 1 comprises a drive motor 2, which is coupled via a drive shaft 3 to a first hydro pump 4 and a second hydro pump 5. The two hydro pumps 4 and 5 are designed for pumping in two directions and can be adjusted in their pumping volume. For this purpose, the two adjustment mechanisms of the first hydro pump 4 and the second hydro pump 5 are activated via an adjustment device, which is not illustrated.

The first hydro pump 4 and the second hydro pump 5 are preferably driven by the same drive shaft 3, wherein a feeder pump 6 is additionally driven by the drive shaft 3. The feeder pump 6 is preferably a constant pump and can pump pressure medium only in one direction.

In order to drive a vehicle, which provides at least four drive wheels, at least one first hydro motor 7, a second hydro motor 8, a third hydro motor 9 and a fourth hydro motor 10 are provided in the hydrostatic travel drive 1. In the exemplary embodiment presented in FIG. 1, the first hydro motor 7 together with the second hydro motor 8 are supposed to drive the wheels of the front axle. The third hydro motor 9 and the fourth hydro motor 10 drive the wheels of the rear axle of the vehicle.

The first hydro pump 4 pumps its pressure medium into a first operating line 11. For this purpose, the first operating line 11 is connected to a first connection 12 of the first hydro pump 4.

In the following explanation, it is assumed that the first hydro pump 4 pumps its pressure medium into the first operating line 11 via its first connection 12. The return flow of pressure medium to the first hydro pump 4 passes via a second operating line 13, which is connected to a second connection 14 of the first hydro pump 4.

Correspondingly, in the exemplary embodiment presented, the second hydro pump 5 pumps its pressure medium into a third operating line 15, which is connected to the second hydro pump 5 at its first connection 16. The pressure medium flowing back to the second hydro pump 5 flows via a fourth operating line 17 to a second connection 18 of the second hydro pump 5.

The first operating line 11 branches at a first branching point 21 into a first portion 11' and a second portion 11" of the first operating line 11. The first portion 11' of the first operating line 11 is connected to a first connection 19 of the first hydro motor 7. The second portion 11" of the first operating line 11 is connected to a first connection 20 of the third hydro motor 9.

The first hydro motor 7 and the third hydro motor 9 are therefore charged with pressure media from the first hydro pump 4.

The third operating line 15 connected to the first connection 16 of the second hydro pump 5 branches at a third branching point 25 into a first portion 15' and a second portion 15" of the third operating line 15. The first portion 15' of the third operating line 15 is connected to a first connection 26 of the second hydro motor 8. Accordingly, the second portion 15" of the third operating line 15 is connected to a first connection 27 of the fourth hydro motor 10.

The second hydro motor 8 and the fourth hydro motor 10 are therefore charged via the third operating line 15 with pressure media from the second hydro pump 5.

The second connection 14 of the first hydro pump 4 is connected via the second operating line 13 and its first portion 13' and second portion 13" to a second connection 28 of the second hydro motor 8 or respectively to a second connection 23 of the third hydro motor 9. The first portion 13' and the second portion 13" of the second operating line 13 open at a second branching point 24 into the second operating line 13. The pressure medium flowing through the second hydro motor 8 and the third hydro motor 9 is therefore supplied via the second operating line 13 of the first hydro pump 4 to its second connection 14, which, in the case of the pumping direction described, forms the vacuum side of the first hydro pump 4.

The return flow of pressure medium to the second hydro pump 5 passes via the fourth operating line 17. The fourth operating line 17 branches at a fourth branching point 30 into a first portion 17' and a second portion 17" of the first operating line 17.

The first portion 17' of the fourth operating line 17 is connected to a second connection 22 of the first hydro motor 7. The second portion 17" of the fourth operating line 17 is connected to a second connection 29 of the fourth hydro motor 10.

The pressure medium pumped by the first hydro motor 7 and the fourth hydro motor 10 accordingly flows back to the second connection 18 of the second hydro pump 5 via the first portion 17' and the second portion 17" of the fourth operating line 17.

With the assumed pumping direction of the first hydro pump 4 and the second hydro pump 5 into the first and respectively third operating line 11 and 15, the first hydro motor 7 and the third hydro motor 9 are charged with pressure medium from the first hydro pump 4. The pressure medium flowing through the first hydro motor 7 flows from there back to the second hydro pump 5. During the further course, the pressure medium is pumped from the second hydro pump 5 to the second hydro motor 8 and the fourth hydro motor 10. The pressure medium pumped by the second hydro motor 8 flows back to the vacuum side of the first hydro pump 4. Accordingly, the first and the second hydro motor 7, 8 are connected in a so-called cross connection to two hydro pumps 4 and 5.

The pressure medium pumped from the first hydro pump 4 is also supplied to the third hydro motor 9 as well as to the first hydro motor 7. However, the pressure medium flowing through the third hydro motor 9 is also pumped back again via the second operating line 13 to the first hydro pump 14. The third hydro motor 9 is therefore connected exclusively to the first hydro pump 4. The pressure medium supplied to the fourth hydro motor 10 as well as to the second hydro motor 8 is pumped back correspondingly from the output of the fourth hydro motor 10 to the second hydro motor 5. Accordingly, the fourth hydro motor 10 is connected exclusively to the second hydro pump 5. The first hydro pump 4 forms a conventional circuit with the hydro motor 8, and the second hydro pump forms a conventional circuit with the fourth hydro motor 10.

The partial cross connection is maintained even with a reversal of the pumping direction, wherein pressure medium is pumped by the first or respectively second hydro pump 4, 5 into the second or respectively fourth operating line 13, 17. The first hydro motor 7 and respectively the second hydro motor 8 are connected in a cross connection to the two hydro pumps 4, 5, whereas the two hydro motors 9, 10 are connected respectively only to one of the two hydro pumps 4, 5 respectively.

In the exemplary embodiment presented, the first hydro motor 7 and the second hydro motor 8 are preferably assigned to the front axle of a vehicle. Accordingly, a front right-hand drive shaft 31, for example, is driven by the first hydro motor 7. By contrast, the hydro motor 8 drives a front left-hand drive shaft 32. However, the third hydro motor 9 and the fourth hydro motor 10 are connected to the drive wheels of a rear vehicle axle. In this manner, the third hydro motor 9 drives a rear right-hand drive shaft 33, and the fourth hydro motor 10 drives a rear left-hand drive shaft 34. A travel drive 1 of this kind can be used, for example, as an all-wheel drive for a digger or other mobile operating equipment.

A limited, flexible oil-flow balance is possible, because the pumped flow of the first hydro pump 4 and respectively the pumped flow of the second hydro pump 5 is subdivided in the case of the hydrostatic travel drive according to the invention, wherein one part of the pumped pressure medium flows back again to the respective hydro pump 4, 5. Indeed, the two drive trains continue to be coupled to one another by the cross connection of the first hydro motor 7 and the second hydro motor 8, thereby providing a differential locking action; however, the coupling is not so rigid as in the case of a complete cross connection of all participating hydro motors. This means that the individual hydro motors can deviate from one another in their absorption volume. Accordingly, the use of the hydrostatic travel drive with a hydro-motor adjustment dependent upon loading pressure is possible.

Even if all of the hydro motors 7-10 are designed as constant motors, an advantage is achieved, because the basic setting of the hydro motors 7-10 need not create an absolute identity between the individual absorption volumes. However, by preference, geared motors or variable motors are used at least in pairs as hydro motors. In this manner, for example, the hydro motors 9 and 10 of the rear axle can be designed as geared motors or variable motors. Of course, the two hydro motors 7 and 8, which are assigned in the illustrated exemplary embodiment to the front axle, can also be designed as geared motors or variable motors.

The assignment of the two cross-connected hydro motors 7 and 8 to the front axle has only been selected for the illustrated exemplary embodiment and is not compulsory. The front right-hand wheel could equally well be driven by the first hydro motor 7, and the rear left-hand wheel could equally well be driven by the second hydro motor 8. Accordingly, the right-hand rear drive wheel would then be driven by the third hydro motor 9 and the left-hand front drive wheel would be driven by the fourth hydro motor 10. In a further alternative embodiment, the first hydro motor 7 drives the right-hand front wheel, the second hydro motor 8 drives the right-hand rear wheel, the third hydro motor 9 drives the left-hand front wheel and the fourth hydro motor 10 drives the left-hand rear wheel.

A feeder system, which is initially pressure-free at start-up, is provided in order to generate a given minimum pressure within the system. The feeder system comprises the feeder pump 6, which is also driven by the drive motor 2. The feeder pump 6 draws pressure medium via a suction line 35 from a tank volume 36 and pumps it into a feeder-pressure line 37. In order to prevent a rise in pressure in the feeder-pressure line 37 above a given value, a feeder-pressure limiting valve 38 is connected to the feeder-pressure line 37. The feeder-pressure limiting valve is subjected to a spring force in the direction of a closed position by an adjustable spring 39. The pressure of the feeder-pressure line 37 supplied via a feeder-pressure measuring line 40 acts against the force of the adjustable spring 39 on a measuring surface on the feeder-pressure limiting valve 38. If the hydraulic force acting on the measuring surface exceeds the force of the opposing spring, the feeder-pressure limiting valve 38 is displaced in the direction towards its open position, so that the feeder-pressure line 37 is connected to the tank volume 36 via a relief line 41. Above a given minimum rotational velocity, a constant pressure is thereby maintained within the feeder system by the feeder pump 6. A further increase in pressure as a result of an increase in rotational velocity of the drive motor 2 is prevented by the feeder-pressure limiting valve 38 and the increasing connection of the feeder-pressure line 37 with the tank volume 36.

The feeder-pressure line 37 is connected at its end facing away from the feeder pump 6 to a first connecting line 42 and to a second connecting line 43. The first connecting line 42 extends from the first operating line 11 to the second operating line 13. The second connecting line 43 extends from the third operating line 15 to the fourth operating line 17.

A first feeder-valve unit 44 is arranged in the first connecting line 42 between the opening of the feeder-pressure line 37 into the first connecting line 42 and the first operating line 11. The first feeder-valve unit 44 provides a non-return valve 45 opening in the direction towards the first operating line 11. The first operating line 11 can be pressurised from the feeder-pressure line 37 via the return valve 45, so long as the pressure in the feeder-pressure line 37 exceeds the pressure in the first operating line 11.

A high-pressure limiting valve 46 is arranged parallel to the non-return valve 45 in order to secure the first operating line 11. A through-flow connection in the closing direction of the non-return valve 45 can be created in the first connecting line 42 via the high-pressure limiting valve 46. For this purpose, the high-pressure limiting valve 46 is pre-stressed in the closing direction by a spring 47, wherein a hydraulic force acts against the force of the spring 47 on a measuring surface of the high-pressure limiting valve 46. The hydraulic force is generated by a pressure of the first operating line 11 supplied via an operating-pressure measuring line 48. Now, if the pressure predominating in the first operating line 11 exceeds a critical value determined by the spring 47, the high-pressure limiting valve 46 opens and the pressure medium can flow out of the first operating line 11 bypassing the non-return valve in the direction of the feeder-pressure line 37.

If a pressure, which is higher than the maximum feeder pressure specified by the feeder-pressure limiting valve 38, is generated in the feeder-pressure line 37, the first operating line 11 is relieved into the tank volume 36.

A corresponding second feeder-valve unit 49 is arranged between the second operating line 13 and the opening of the feeder-pressure line 37 into the first connecting line 42. The second feeder-valve unit 49 is structured in a corresponding manner to the first feeder-valve unit, and it is therefore unnecessary to reiterate the description of the function of these elements. If the pressure in the second operating line 13 is disposed below the pressure predominating in the feeder-pressure line 37, the pressure medium removed from the first operating line 11 can also be drawn off via a non-return valve of the second feeder valve unit 49 into the second operating line 13.

In order to fill the third operating line 15 or respectively the fourth operating line 17 and in order to secure their pressure, a corresponding third feeder-valve unit 50 and a fourth feeder-valve unit 51 are provided in the second connecting line 42 on both sides of the opening of the feeder-pressure limiting valve 37 into the second connecting line 43. The third feeder-valve unit 50 and the fourth feeder-valve unit 51 correspond in structure and function to the first feeder-valve unit 44 and the second feeder-valve unit 49. A description of the third and fourth feeder valve units 50, 51 has therefore been omitted in order to avoid unnecessary repetition.

The hydrostatic travel drive according to the invention is not restricted to the exemplary embodiments described. On the contrary, it is possible to combine the individual features of the exemplary embodiments described with one another as required.

The invention claimed is:

1. Hydrostatic travel drive with at least one first hydro pump and a second hydro pump and a first, second, third and fourth hydro motor,
   wherein
   each said hydro motor has precisely two operational connections, consisting of a first connection and second connection, and each single said hydro motor respectively drives a separate single drive shaft, and each single said drive shaft is driven exclusively by one said hydro-motor, and the first connection of the first hydro pump is connected to the first connection of the first hydro motor and to the first connection of the third hydro motor,
   the first connection of the second hydro pump is connected to the first connection of the second hydro motor and to the first connection of the fourth hydro motor,
   the second connection of the first hydro motor and the second connection of the fourth hydro motor are connected to the second connection of the second hydro pump,
   the second connection of the second hydro motor and the second connection of the third hydro motor are connected to a second connection of the first hydro pump;
   the third hydro motor is connected to the first hydro pump and forms a closed cycle with said first hydro pump by directly connecting said first connection of said first hydro pump to said first connection of said third hydro motor and directly connecting said second connection of said third hydro motor to said second connection of said first hydro pump, and the fourth hydro motor is connected to the second hydro pump and forms a closed cycle with said second hydro pump by directly connecting said first connection of said second hydro pump to said first connection of said fourth hydro motor and directly connecting said second connection of said fourth hydro motor to said second connection of said second hydro pump.

2. Hydrostatic travel drive according to claim 1, wherein the first and the second hydro motor are assigned to one vehicle axle.

3. Hydrostatic travel drive according to claim 1, wherein the third and the fourth hydro motor are assigned to one vehicle axle.

4. Hydrostatic travel drive according to claim 1, wherein the first and the second hydro motor are assigned to one side of the vehicle.

5. Hydrostatic travel drive according to claim 1, wherein the third and the fourth hydro motor are assigned to one side of the vehicle.

6. Hydrostatic travel drive according to claim 1 wherein the first and the second hydro motor are selectively constant motors, geared motors or variable motors.

7. Hydrostatic travel drive according to claim 1 wherein the third and the fourth hydro motor are selectively constant motors, geared motors or variable motors.

* * * * *